(12) United States Patent
Capots

(10) Patent No.: US 6,568,638 B1
(45) Date of Patent: May 27, 2003

(54) MODULAR SPACECRAFT STRUCTURE

(75) Inventor: Larry H. Capots, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 109 days.

(21) Appl. No.: 09/706,833

(22) Filed: Nov. 7, 2000

(51) Int. Cl.7 .................................................. B64G 1/00
(52) U.S. Cl. .................................. 244/158 R; 244/159
(58) Field of Search ........................... 244/159, 158 R, 244/120

(56) References Cited

U.S. PATENT DOCUMENTS

| | | | |
|---|---|---|---|
| 4,848,525 A | 7/1989 | Jacot et al. | 188/378 |
| 4,878,637 A | * 11/1989 | Mullen | 244/159 |
| 5,839,696 A | 11/1998 | Caplin et al. | 244/159 |
| 5,870,063 A | 2/1999 | Cherrette et al. | 343/85.3 |
| 5,961,076 A | 10/1999 | Eller et al. | 244/158 R |
| 5,979,833 A | 11/1999 | Eller et al. | 244/158 R |
| 6,037,909 A | 3/2000 | Cherette | 343/771 |
| 6,109,564 A | * 8/2000 | Bui et al. | 244/159 |
| 6,318,674 B1 | * 11/2001 | Simburger | 244/159 |

* cited by examiner

Primary Examiner—J. Woodrow Eldred
(74) Attorney, Agent, or Firm—Swidler Berlin Shereff Friedman, LLP

(57) ABSTRACT

A spacecraft structure formed of one or more interchangeable modules is disclosed. The modules have two planar surfaces that cooperate to form a cavity, in which spacecraft equipment is housed. The modules are movable from a substantially stacked configuration to a substantially planar configuration. The disclosed spacecraft structure results in an increased ability to dissipate heat, a facilitated integration and testing process, a facilitated servicing process, a more efficient operational environment, and a more efficient use of space. The spacecraft design results in reduced spacecraft manufacturing, test and integration time, which will reduce overall cost, compared to present designs. The spacecraft in deployed, substantially planar configuration can be oriented with a planar surface facing toward or away from Earth or any suitable orientation between these extremes. As a result of the modularity and deployable in-orbit features, some portions of the structure may be deployed at right angles if required by mission constraints.

14 Claims, 9 Drawing Sheets

MODULAR SPACECRAFT STRUCTURE

BACKGROUND OF THE INVENTION

1. Field of the Invention

This invention relates to a spacecraft, and more specifically to a spacecraft comprising a modular structure.

2. Description of the Related Art

Spacecraft are widely used for communicating between Earth stations, and are becoming more important for communications in regions of the world where other communication paths are not available. Ordinary geosynchronous ("GEO") spacecraft at their present state of development require expenditure of propellant in order to aid in maintaining their attitude, and/or their location in space, that is, their station. When the propellant is exhausted, the utility of the spacecraft is ended, and a new spacecraft must be launched to take over the communication function. Thus, there is a substantial industry that engages in fabrication and launch of spacecraft, both for new communications functions, and for replacing spacecraft that become inoperable.

The fabrication and launch of spacecraft has in the past been very costly, at least in part because each spacecraft was custom-designed and built for a particular use. Thus, there is a need to produce spacecraft in a more cost-effective manner. One solution is to create a modular spacecraft structure. Aspects of each spacecraft that are unique to the particular mission that it is to serve have been resistant to modularization. Thus, custom designs are needed that require the attention of skilled engineers, and fabrication of the custom design is expensive, requiring extensive integration and testing ("I&T"), all of which increases the lead-time. Thus, it would be desirable to create a completely modular spacecraft structure. Prior attempts to modularize have been made, but have resulted in only limited modularity. There is still some amount of custom design that is necessary with known modular spacecraft.

The equipment carried by spacecraft generates heat as an inherent by-product of its operation. Heat rejection or dissipation is a constant concern and limiting factor of GEO spacecraft design. Because spacecraft operate in a vacuum or near-vacuum environment, heat rejection from the spacecraft is limited to radiant heat transfer. The amount of exposed surface area is one factor upon which radiant heat transfer depends. Thus, it would be desirable to maximize the surface area of the spacecraft by making a spacecraft as planar as possible. Prior spacecraft structures have provided for some planar aspects, but not a spacecraft structure that, in its entirety, is substantially planar.

SUMMARY OF THE INVENTION

It is an object of the present invention to provide an interchangeable module, which can be used to form a substantially planar spacecraft structure.

It is another object of the present invention to provide a spacecraft structure that facilitates servicing of the modules.

It is another object of the present invention to provide a spacecraft that minimizes wasted space.

It is another object of the present invention to provide a spacecraft that has increased heat rejection capability.

It is another object of the present invention to provide a spacecraft that has the ability to thermally and vibrationally isolate the individual modules.

To achieve the above and other objectives, the present invention provides a spacecraft comprising one or more interchangeable modules. The modules can be connected in a variety of ways, including in such a manner so as to thermally and vibrationally isolate the modules from each other. The modules allow for reduced I&T, reduced lead-time, facilitated servicing, and increased efficiency.

In a preferred embodiment of the present invention, the modules have first and second surfaces to facilitate heat dissipation and that cooperate to form a cavity in which spacecraft equipment can be mounted. The modules can be oriented in a stacked position to facilitate transport into orbit, or in a planar position to facilitate in-orbit operation. The planar configuration allows for increased heat rejection, which allows more equipment per unit volume to be used in a single spacecraft than current designs.

BRIEF DESCRIPTION OF THE DRAWINGS

The present invention is described with reference to the accompanying drawings, in which like reference characters reference like elements, and wherein.

DETAILED DESCRIPTION OF THE INVENTION

Figure 1:
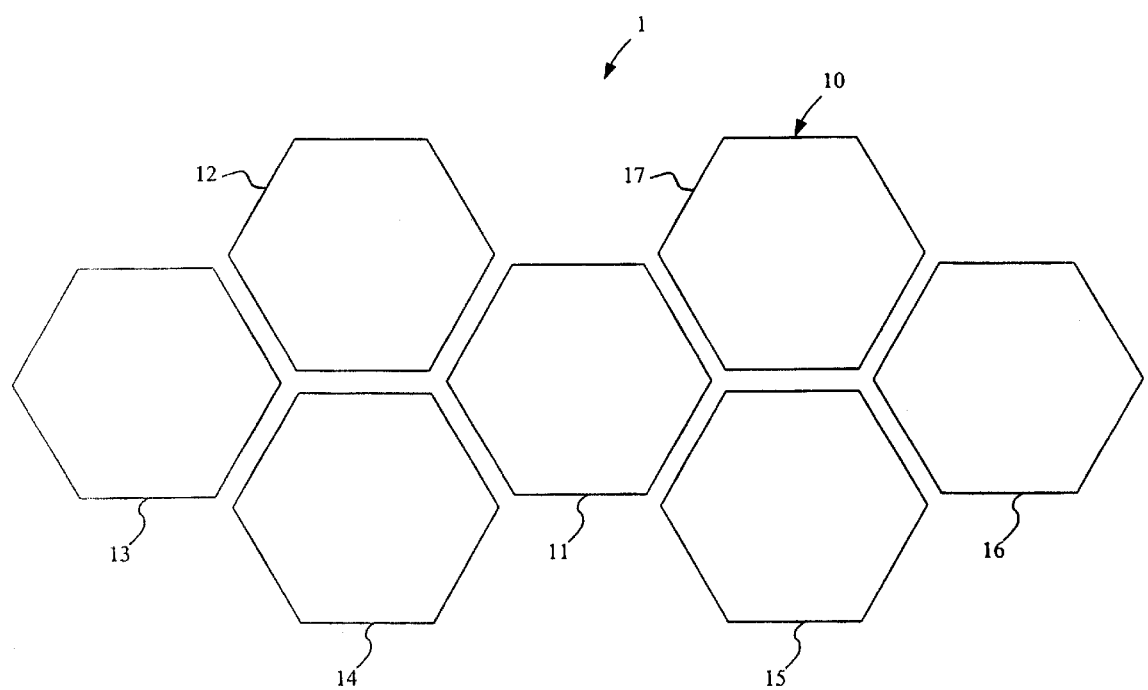
FIG. 1 is a schematic view of a preferred embodiment of the spacecraft structure of the present invention in the planar configuration.

FIG. 1 is a schematic view of a preferred embodiment of the spacecraft structure of the present invention. Spacecraft structure 1 comprises one or more interchangeable modules 10. Seven modules 11–17 are shown in the figures, but any number of modules 10 may be used. FIG. 1 shows modules 11–17 arranged in a planar configuration. This is the in-orbit configuration. Modules 11–17 may also be arranged in a stacked configuration, as shown in FIG. 2A. This configuration is particularly useful for storing and transporting spacecraft structure 1.

Figure 2B:
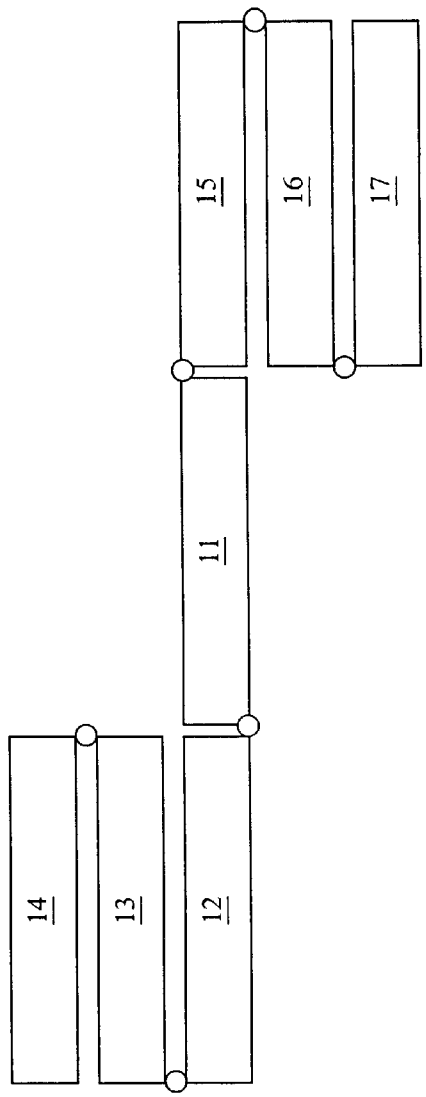
FIGS. 2B, 2C, and 2D illustrate the transition of the spacecraft structure of the present invention from the stacked configuration of FIG. 2A to the planar configuration of FIG. 1.
Figure 2A:
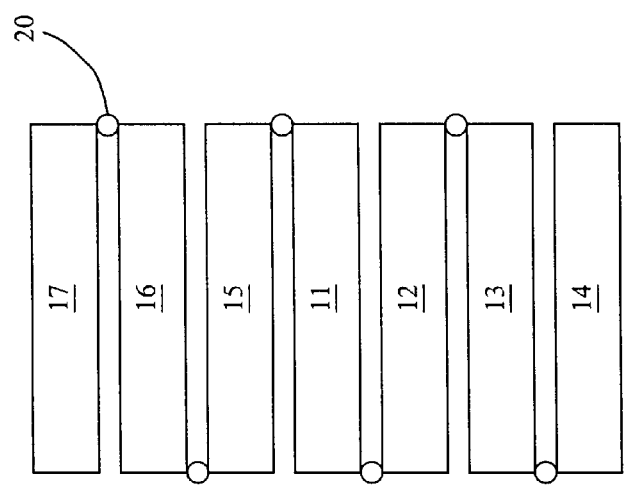
FIG. 2A is the spacecraft structure of FIG. 1 in the stacked configuration.
Figure 2C:
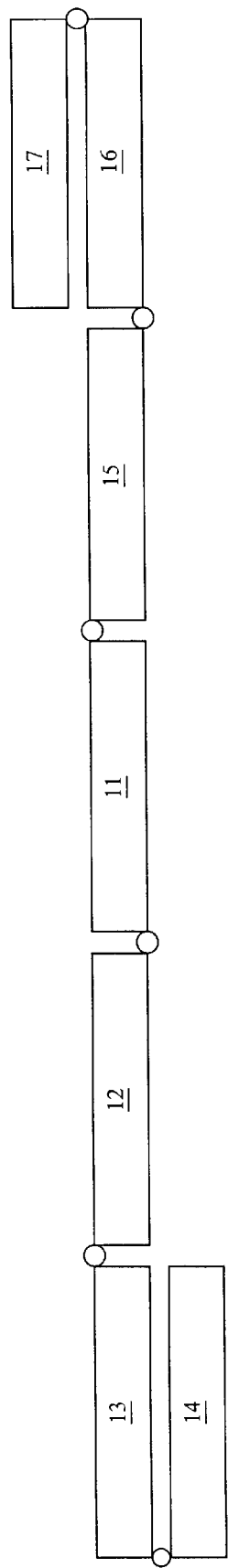
Figure 2D:
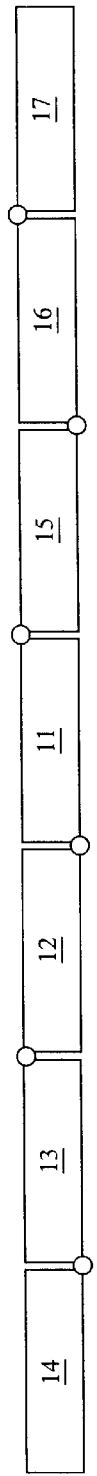

FIGS. 2B, 2C, and 2D illustrate an example of how modules 11–17 can be moved from the stacked configuration of FIG. 2A to the planar configuration of FIG. 1. Starting from the stacked configuration of FIG. 2A, modules 12–14 as a group are rotated via module-to-module joint 20 outward from a first side of module 11 and modules 15–17 as a group are rotated via module-to-module joint 20 outward from a second side of module 11 (see FIG. 2B). In this position, it will be noticed that modules 12–14 and 15–17 are arranged in separate stacked configurations, while modules 11, 12, and 15 are arranged in a planar configuration. From the position of FIG. 2B, modules 13 and 14 as a group are rotated outward from module 12 and modules 16 and 17 as a group are rotated outward from module 15 (see FIG. 2C). In this position, it will be noticed that modules 13–14 and 16–17 are arranged in separate stacked configurations, while modules 11–13, 15, and 16 are arranged in a planar configuration. Finally, from the position of FIG. 2C, module 14 is rotated outward from module 13 and module 17 is rotated outward from module 16 (see FIG. 2D). In this position, all modules 11–17 are arranged in a planar configuration. Those of ordinary skill in the art will appreciate that the above process can be modified to suit spacecraft structures 1 containing any number of modules 10.

Modules 11–17 are moved as described above via module-to-module joints 20. Joints 20 may take several forms. One possible form is a mechanical joint, such as a hinge. Such joints are readily available and facilitate in-orbit module replacement. Another possible form is a shape-memory metal joint. Such a joint is described in U.S. Pat. No. 5,312,152, which is incorporated by reference herein in its entirety. Adding an electromechanical release to joint 20 is desirable to allow easy separation of joint 20 from modules 10. This release could hold the modules in place during launch and deployment and then allow for non-contact suspension in the deployed state.

Figure 3:
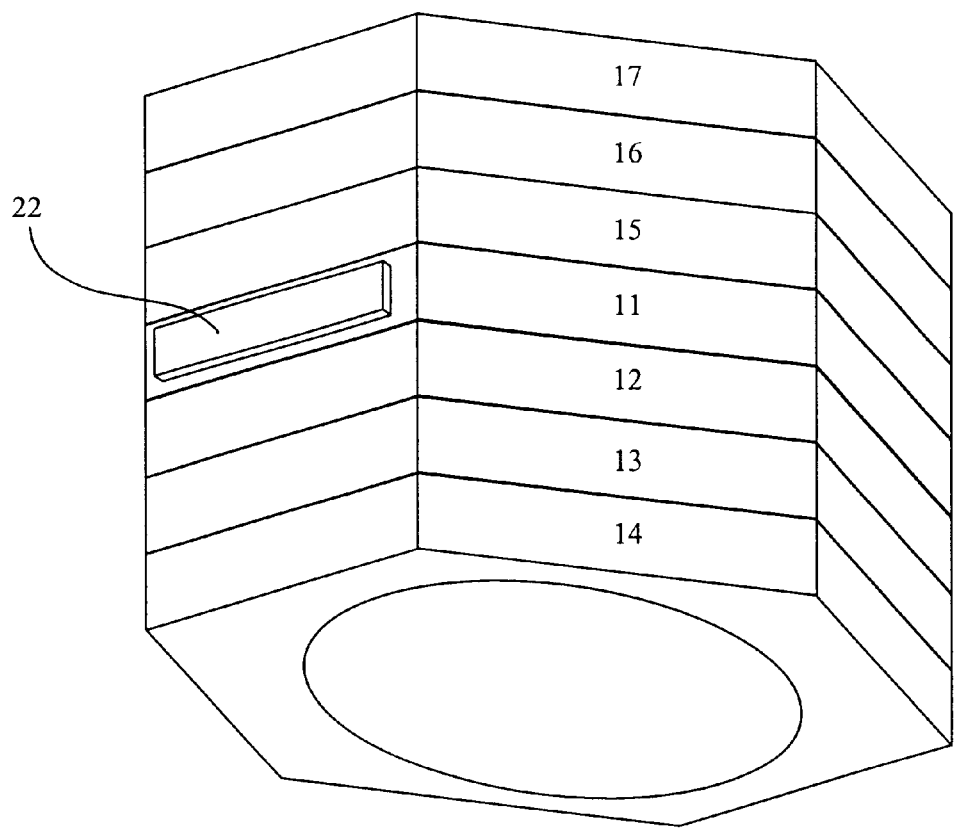
FIG. 3 illustrates a typical setup of the spacecraft structure of the present invention in the stacked configuration.
Figure 4:
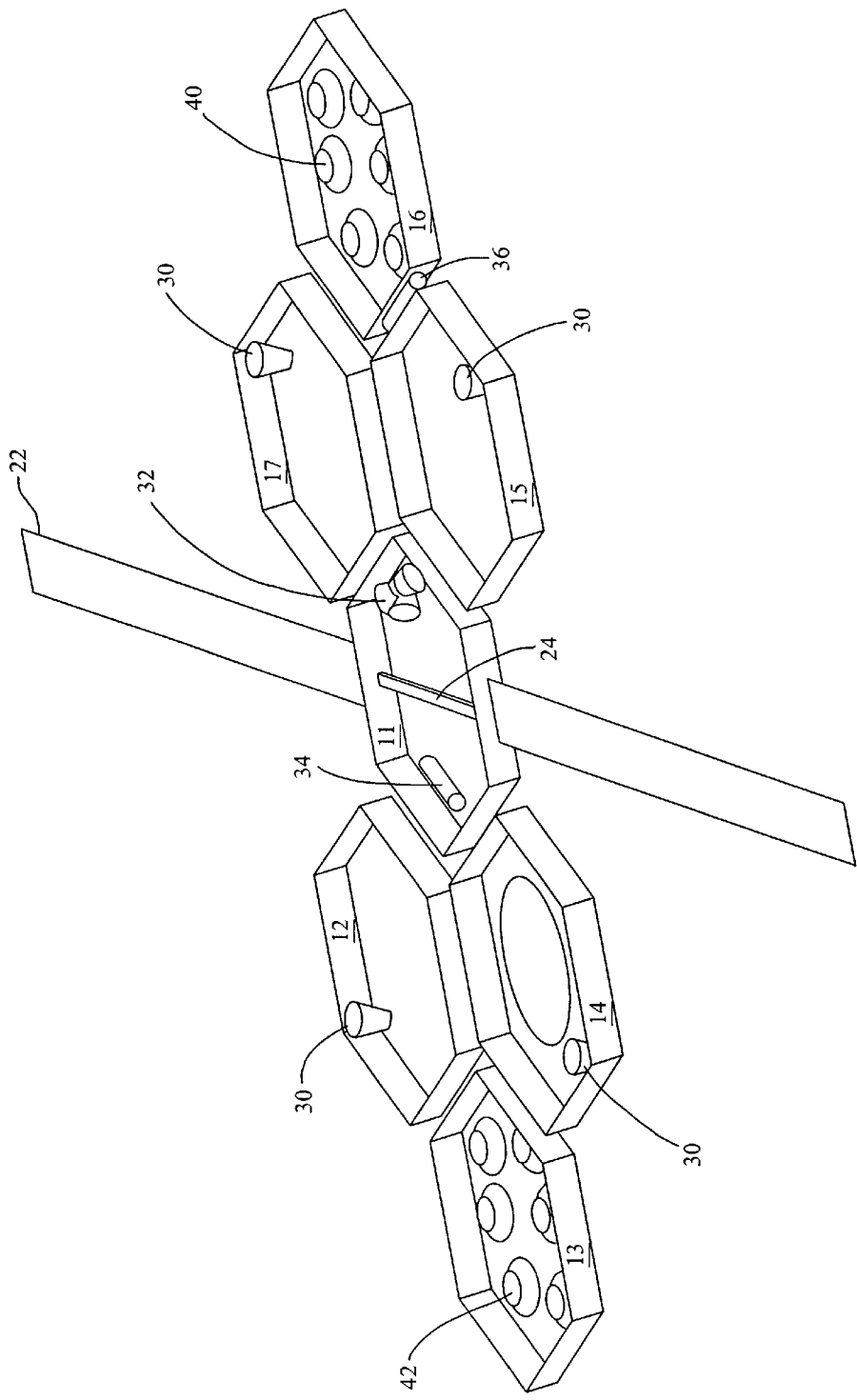
FIG. 4 is the spacecraft structure of FIG. 3 in the planar configuration.
Figure 5A:
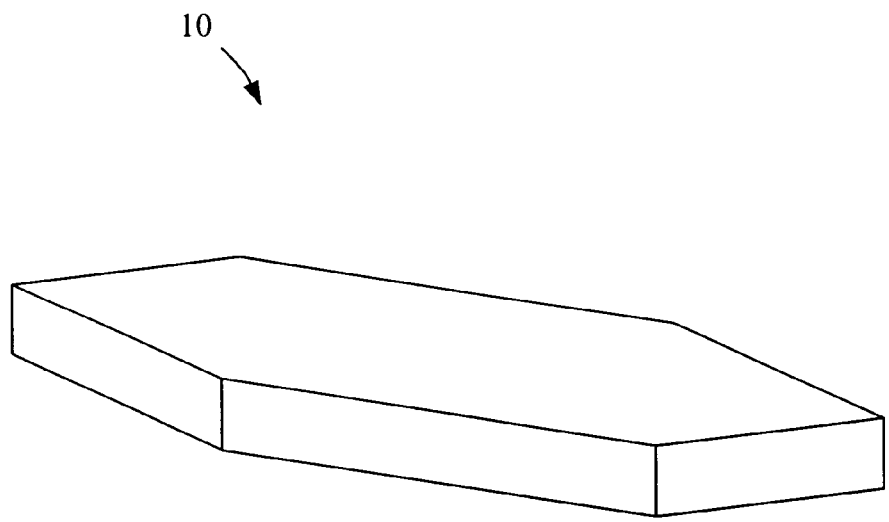
FIGS. 5A and 5B show more detailed views of modules that make up the spacecraft structure of FIG. 1.
Figure 5B:
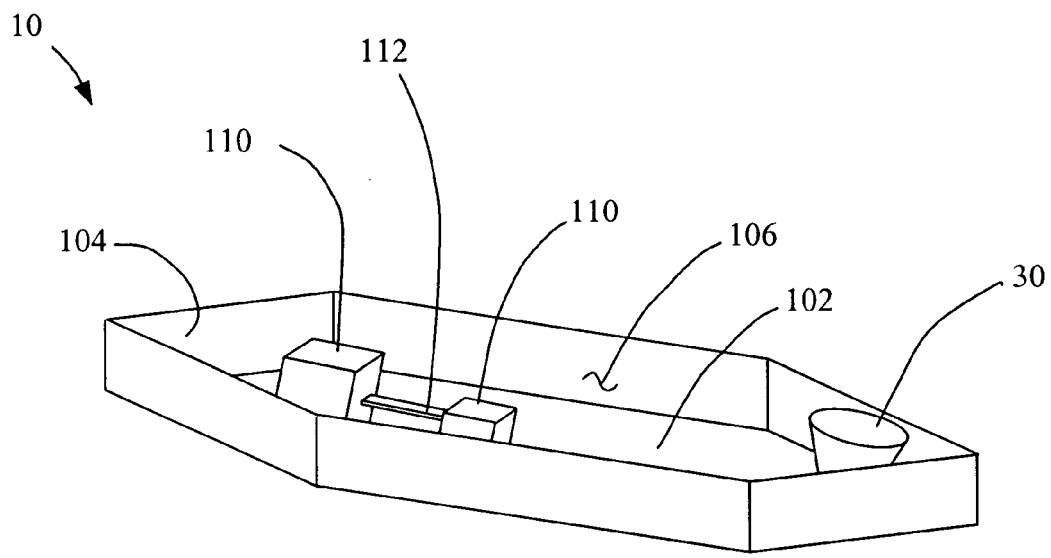
Figure 6:
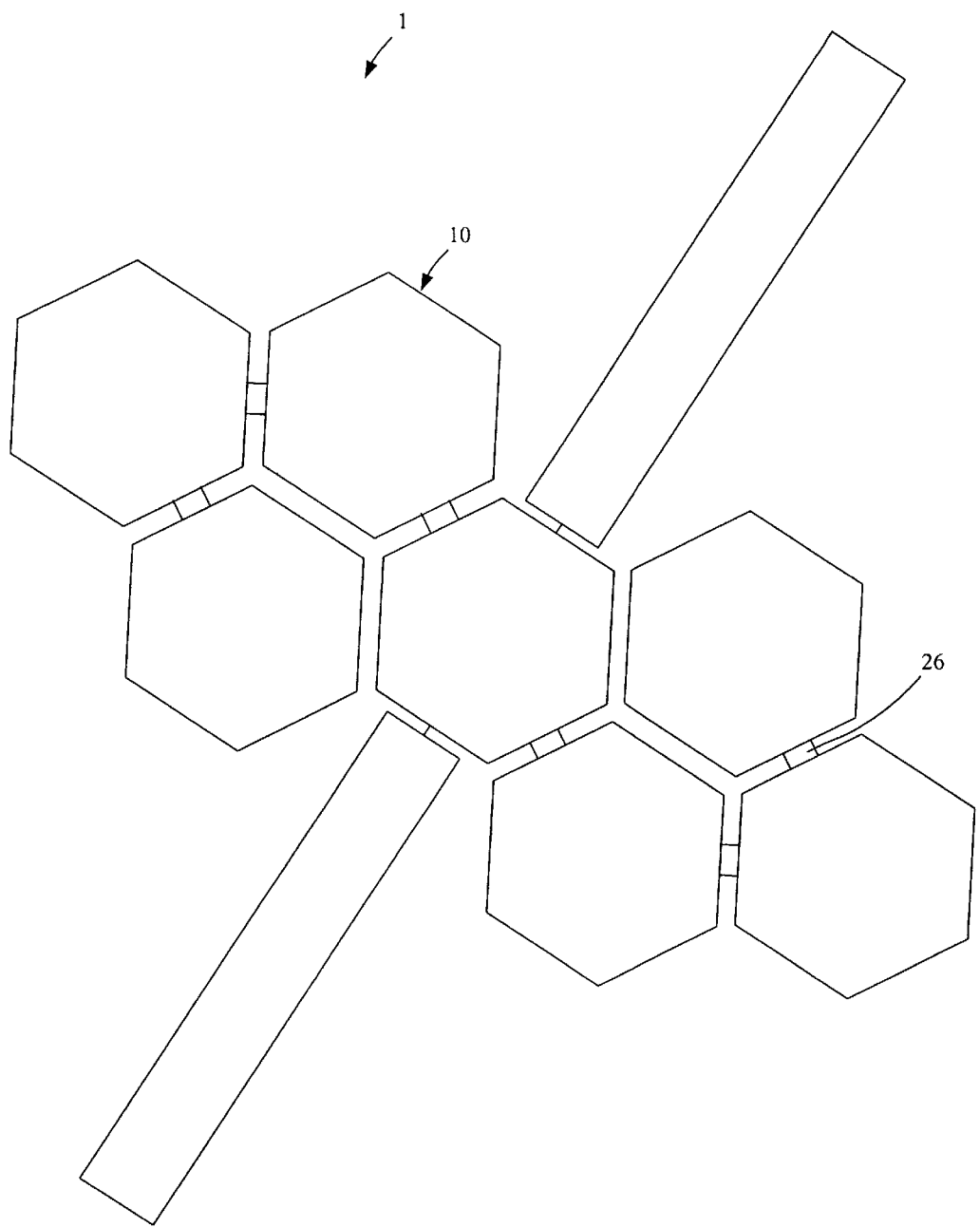
FIG. 6 is the embodiment of FIG. 1 with the solar panels extended.
Figure 7:
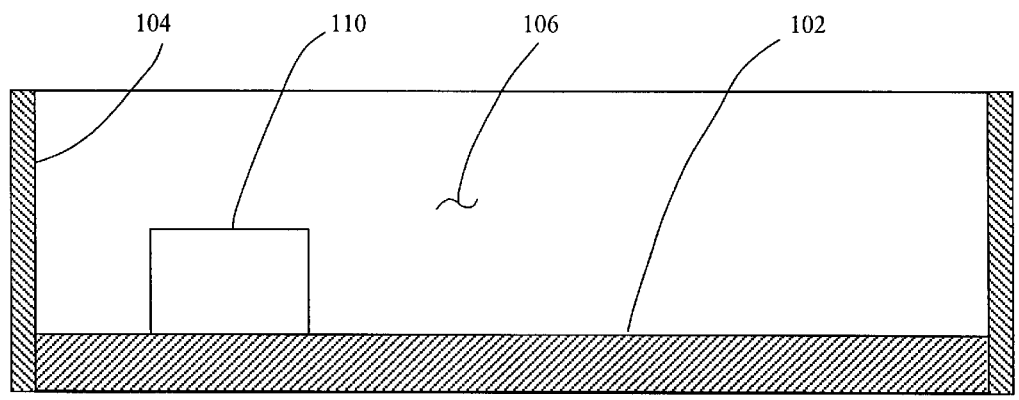
FIG. 7 is a cross sectional view of a first embodiment of a module of the present invention.
Figure 8:
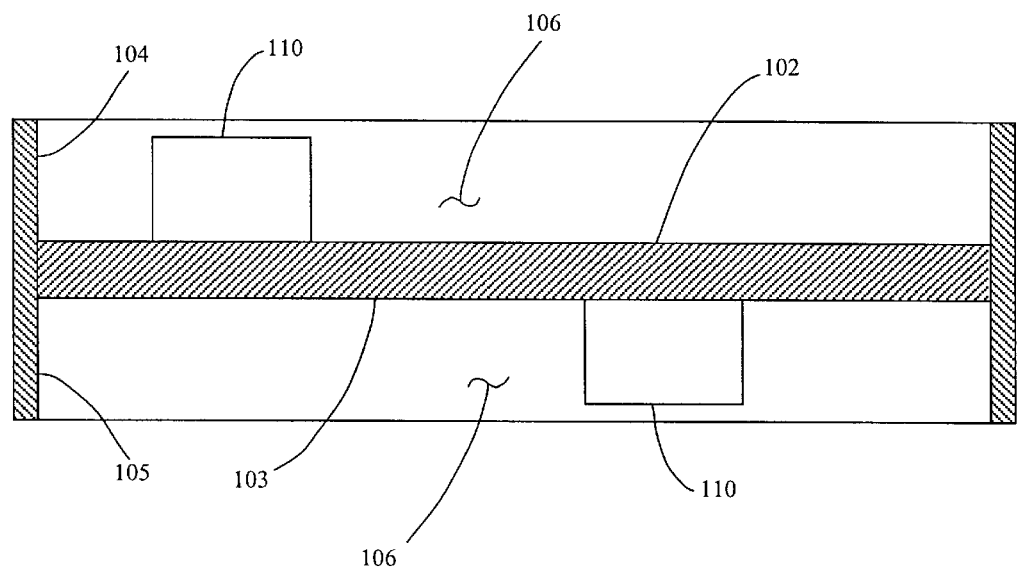
FIG. 8 is a cross sectional view of a second embodiment of a module of the present invention.

FIG. 3 illustrates a typical setup of the spacecraft structure of the present invention in the stacked configuration, and FIG. 4 illustrates the spacecraft structure of FIG. 3 in the planar configuration. Each module 10 is itself substantially planar, and when arranged in the planar configuration (see FIG. 4), the entire spacecraft structure 1 is substantially planar. As seen in FIGS. 5A, 5B, and 7, module 10 has a substantially planar surface 102 and a second surface 104. Surface 104 cooperates with surface 102 to form a cavity 106. FIGS. 5A and 5B show a cruciform or cup-like embodiment of module 10, in which surface 104 extends away from surface 102 along the perimeter of surface 102. In another embodiment (see FIG. 8), a third surface 103 and a fourth surface 105 cooperate to form a second cavity 106. Spacecraft equipment 110 can be housed within cavity 106. Exemplary equipment could include solar panel extender/retractor 24 (for use with solar panels 22), thrusters 30, reaction control wheels 32, batteries 34, antennae 40, amplifiers 42, and any other equipment the particular mission requires. Equipment 110 can be connected by connections 112. Connections 112 can take any suitable form. A preferred form is the multifunctional structure disclosed in commonly assigned U.S. Pat. No. 6,061,243, which is incorporated by reference herein in its entirety. This multifunctional structure can also be used for module-module wiring 36, which can connect components of equipment 110 of separate modules 10 in known fashion.

Forming spacecraft structure 1 of modules 10 significantly reduces the time required for servicing. The design of modules 10 allows for easier access to equipment 110 than was possible with prior spacecraft design, which often crowded equipment together in a cylindrical housing. Several advantageous features of modules 10 result from its modularity. Modules 10 can be used for several different missions, employing different designs of spacecraft structure 1. I&T is facilitated and decreased—a particular module 10 design can be made and tested at the modular level, and then subsequent modules 10 of the same design can be made and used in several different spacecraft without having to redo all the I&T. Designs of spacecraft structure 1 are reusable—a particular design can be used with a first mission and then reused with a second, completely different mission. The modularity also means that one set of tooling can be used instead of designing custom tooling for each custom spacecraft design, as has been done in the past. This facilitates servicing or repairing spacecraft 1, both on Earth or in-orbit. Another inherent feature is that the modules 10 are interchangeable—if one module 10 must be replaced, another module 10 will fit in its place. Use of modules 10 results in a spacecraft structure 1 that is adaptable to virtually any mission by including additional module(s) 10 with the existing structure 1.

Typical dimensions for module 10 are 150 inches between parallel sides of the hexagonal shape shown in the drawings and 24 inches thick. However, virtually any other dimensions are possible. Those artisans of ordinary skill in the relevant art will realize that the size of modules 10 can be optimized for volumetric efficiency. It should be noted that although only hexagonal modules 10 are shown, modules 10 could be of any shape. FIG. 4 shows a typical outfitting for spacecraft structure 1: module 11 is a power and vehicle maintenance cell; modules 12, 14, 15, and 17 are propulsion cells; and modules 13 and 16 are antenna cells. The preferred material from which to make modules 10 is graphite epoxy, although other suitable materials having favorable strength and stiffness properties may be substituted.

In addition to facilitated servicing, the design of modules 10 also allows increased heat dissipation. The equipment carried by spacecraft generates heat as an inherent by-product of operation. To avoid overheating, which renders the equipment unusable, it is necessary to reject or dissipate this generated heat away from the spacecraft. Because spacecraft operate in a vacuum or near-vacuum environment, heat rejection from the spacecraft is limited to radiant heat transfer. The rate and magnitude of radiant heat transfer depends on, among other things, the area of the emitting surface. Thus the arrangement of the heat-generating equipment 110 on planar surface 102, rather than in a cylindrical housing, typical with prior spacecraft, facilitates heat rejection from spacecraft structure 1.

The amount of equipment a spacecraft can carry is therefore limited by its ability to reject heat. Stated another way, the better a spacecraft's ability to reject heat, the more heat-producing equipment the spacecraft can carry. With prior GEO spacecraft, such equipment was generally limited to requiring 15 kW of power or less. 20 kW equipment was achievable for the most advanced GEO spacecraft. The spacecraft structure of the present invention allows using equipment well in excess of 20 kW. 30 kW, 40 kW, or even 100 kW can be achieved.

While heat is transmitted away from an in-orbit spacecraft only by radiant heat transfer, heat is transmitted through the spacecraft via conduction. Thus, it would be desirable to thermally isolate those apparatus that create a significant amount of heat so that heat is not transferred to other apparatus, which may be more heat-sensitive. One way to prevent such heat transfer through the spacecraft is to use a non-contact tether as the module-module tether 26. Examples of non-contact tethers include electrostatic and electromagnetic tethers. These tethers typically establish a series of electric or magnetic fields between the pieces being tethered to establish a push/pull system. Sensors are used to determine the relative position and attitude of the pieces. If the pieces get too close together, they are pushed apart; if the pieces get too far apart, they are pulled together. Optionally, a "hard stop" can be included to ensure the pieces do not drift too far apart in the event of a control system failure. Relative position/attitude control loops are also typically included. These control loops ensure the tethered pieces are maintained in the desired configuration for proper spacecraft and mission operation. Thus, such tethers maintain modules 10 in the desired position relative each other without physically contacting the other modules 10. Since the modules 10 are not in contact with each other, heat is not transmitted via conduction between the modules 10. Heat isolation is particularly useful for modules carrying high power communications devices.

In addition to providing thermal isolation, non-contact tethers also provide vibrational isolation. Thus vibrations created in one module 10 are not transmitted to another module 10. This allows vibration-creating equipment to be used adjacent vibration-sensitive equipment on the same spacecraft. Vibrational isolation is particularly useful for modules 10 carrying configuration-sensitive equipment or optical and imaging devices.

Figure 9:
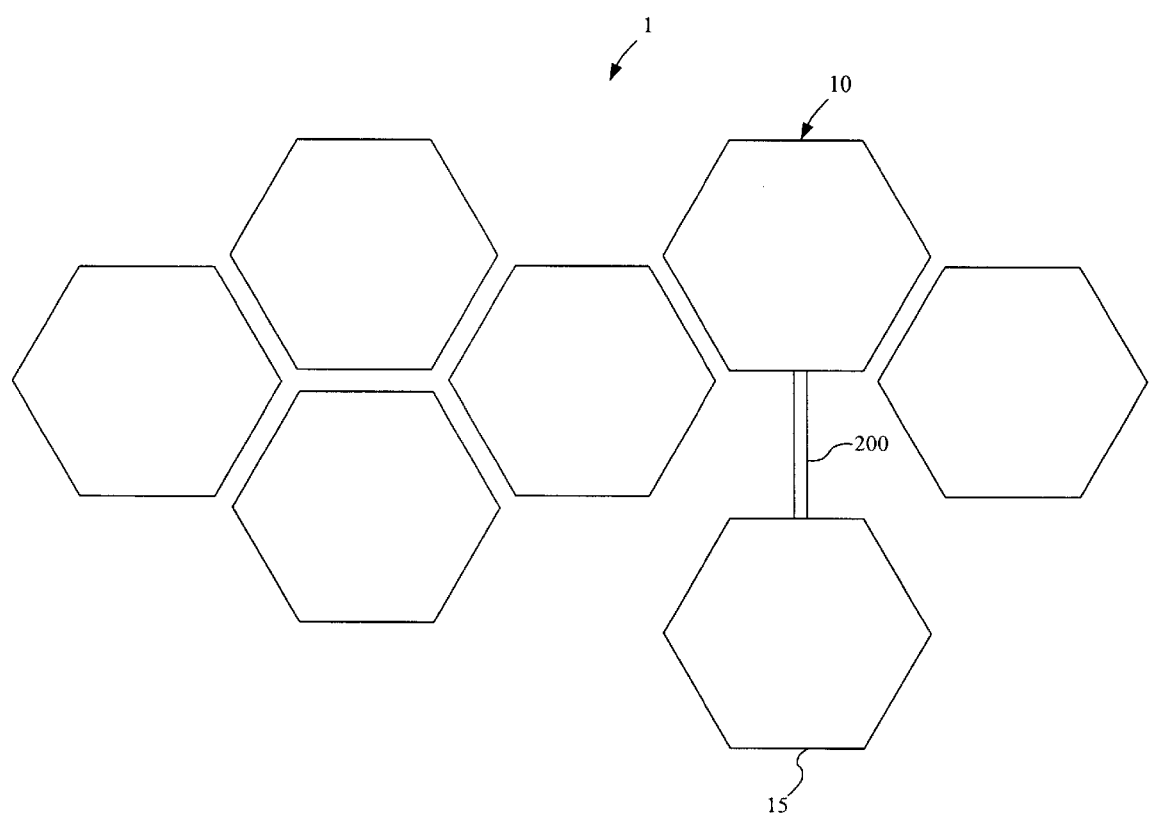
FIG. 9 is a schematic view of another preferred embodiment of the spacecraft structure of the present invention in the planar configuration with one of the modules extended away from the spacecraft structure.

FIG. 9 shows another embodiment of the present invention. There it is seen that module 15 has been temporarily separated from the rest of structure 1. At times, it may be desired to temporarily separate an individual module 10 from structure 1. For example, temporary separation may be desired for modules 10 carrying payloads for optical or radio frequency interferometry. The means for separation may take several forms. Extendable boom 200 is one option. Boom 200 may especially be appropriate where mechanical tethers 26 are used. Another option for accomplishing temporary module separation is to provide modules 10 that are self-propelled. Self-propelled modules may especially be appropriate where non-contact tethers 26 are used.

The spacecraft in deployed, substantially planar configuration can be positioned in any desired orientation. The spacecraft can be oriented so that planar surface 102, 103 faces toward or away from Earth, or in any suitable orientation between these extremes. This allows the spacecraft structure 1 to be used with any mission, particularly those wherein the orientation of certain equipment—such as a telescope or imaging system—must be varied throughout the mission. Additionally, as a result of the modularity and deployable in-orbit features, some modules 10 of the structure may be deployed at an angled orientation, if required by mission constraints. For example, if a particular mission requires a first piece of equipment to be positioned toward a first point on Earth and a second piece of equipment to be positioned toward a second point on Earth, spacecraft structure 1 could achieve these requirements by adjusting the relative angle between the modules 10 upon which the first and second pieces of equipment are located.

While the preferred embodiments of the present invention have been described with respect to a GEO spacecraft, the invention is equally adapted to low Earth orbit ("LEO"), medium Earth orbit ("MEO"), and deep space missions. While the present invention has been described with respect to communications spacecraft, the invention may also be used with any other type of spacecraft—remote sensing data collection and transmission, for example.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents.

What is claimed is:

1. A spacecraft structure, comprising:
a plurality of interchangeable modules coupled together by one or more connectors to create the spacecraft structure, with said interchangeable modules movable via said connectors from a substantially stacked configuration in which said modules are aligned vertically to a substantially planar configuration in which said modules are aligned horizontally.

2. The spacecraft structure of claim 1, wherein said connectors comprise a mechanical connector.

3. The spacecraft structure of claim 1, wherein said connectors comprise a shape-memory metal connector.

4. The spacecraft structure of claim 1, wherein each of said interchangeable modules comprises:
a first, substantially planar surface; and
a second surface cooperating with said first surface to form a cavity for housing spacecraft equipment.

5. The spacecraft structure of claim 1, wherein said connectors comprise a non-contact connector.

6. The spacecraft structure of claim 1, wherein said modules are of uniform design.

7. The spacecraft structure of claim 1, wherein at least some of said interchangeable modules contain spacecraft equipment.

8. The spacecraft structure of claim 7, wherein said equipment requires power in an amount greater than 20 kW.

9. The spacecraft structure of claim 1, wherein said spacecraft structure can assume an in-orbit orientation with any portion thereof facing toward Earth.

10. A spacecraft structure, comprising:
two modules; and
a connector coupling said modules such that said modules can assume a first in-orbit configuration in which said modules are co-planar and a second in-orbit configuration in which said modules are angled.

11. The spacecraft structure of claim 10, wherein said connector is a mechanical connector.

12. The spacecraft structure of claim 11, wherein said mechanical connector comprises an extendable boom.

13. The spacecraft structure of claim 10, wherein said connector is a non-contact connector.

14. The spacecraft structure of claim 10, wherein said modules are detachedly coupled.

\* \* \* \* \*